United States Patent
Kruger et al.

(10) Patent No.: US 8,842,126 B2
(45) Date of Patent: Sep. 23, 2014

(54) METHODS AND SYSTEMS TO FACILITATE OPERATION IN UNPINNED MEMORY

(75) Inventors: Warren Fritz Kruger, Sunnyvale, CA (US); Philip J. Rogers, Pepperell, MA (US); Mark Hummel, Franklin, MA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 154 days.

(21) Appl. No.: 13/324,443

(22) Filed: Dec. 13, 2011

(65) Prior Publication Data

US 2013/0147821 A1     Jun. 13, 2013

(51) Int. Cl.
*G06F 13/00*     (2006.01)
*G06F 13/28*     (2006.01)

(52) U.S. Cl.
USPC .......................................... 345/536; 711/154

(58) Field of Classification Search
None
See application file for complete search history.

(56) References Cited

U.S. PATENT DOCUMENTS

| | | | | |
|---|---|---|---|---|
| 6,944,736 B2* | 9/2005 | Wilson et al. | ................. | 711/167 |
| 7,711,990 B1* | 5/2010 | Nickolls et al. | ................. | 714/37 |
| 8,451,281 B2* | 5/2013 | Ginzburg | ...................... | 345/541 |
| 2008/0168130 A1* | 7/2008 | Chen et al. | .................... | 709/203 |
| 2010/0293543 A1* | 11/2010 | Erhart et al. | ....................... | 718/1 |
| 2010/0325383 A1* | 12/2010 | Karamcheti et al. | .......... | 711/203 |
| 2011/0153983 A1* | 6/2011 | Hughes et al. | .................. | 712/22 |
| 2012/0233439 A1* | 9/2012 | Ginzburg et al. | ............. | 711/206 |
| 2012/0236010 A1* | 9/2012 | Ginzburg et al. | ............. | 345/502 |
| 2013/0007406 A1* | 1/2013 | Sheaffer et al. | ............... | 711/207 |

\* cited by examiner

*Primary Examiner* — Joni Richer
*Assistant Examiner* — Yi Wang
(74) *Attorney, Agent, or Firm* — Sterne, Kessler, Goldstein & Fox P.L.L.C.

(57) ABSTRACT

In an embodiment, a method of processing memory requests in a first processing device is provided. The method includes generating a memory request associated with a memory address located in an unpinned memory space managed by an operating system running on a second processing device; and responsive to a determination that the memory address is not resident in a physical memory, transmitting a message to the second processing device. In response to the message, the operating system controls the second processing device to bring the memory address into the physical memory.

23 Claims, 4 Drawing Sheets

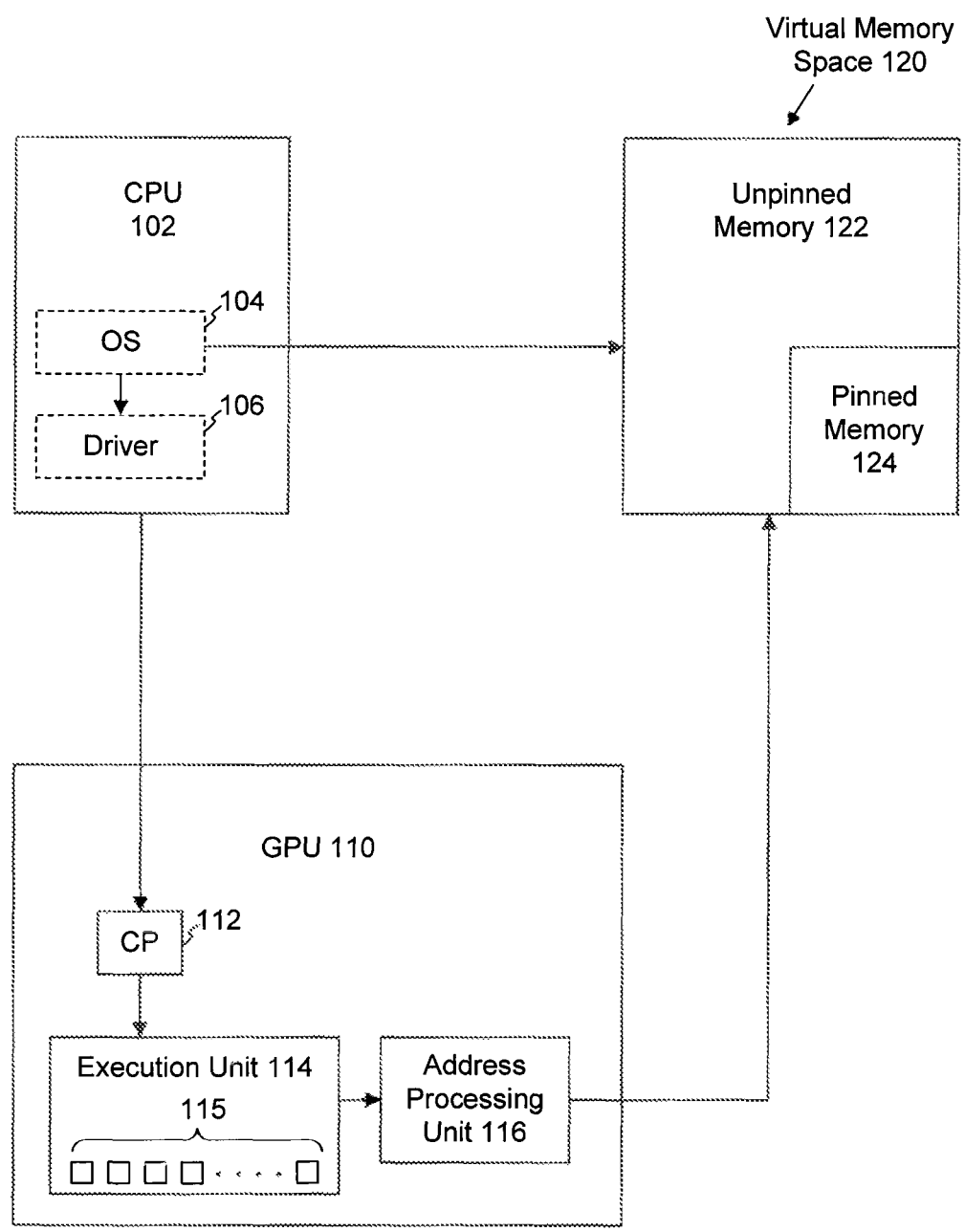
FIG. 1
Conventional

METHODS AND SYSTEMS TO FACILITATE OPERATION IN UNPINNED MEMORY

BACKGROUND

1. Field

The present invention is generally directed to computing systems. More particularly, the present invention is directed to techniques for enabling operations to use different types of virtual memory spaces in computing systems.

2. Background Art

Many processing systems include a central processing unit (CPU) and a graphics processing unit (GPU). The CPU is a largely serial device that processes instructions sequentially, with subsequent instructions often relying on the results of previous instructions. The GPU, on the other hand, is a highly parallelized device, often including multiple execution units. Through its parallelized architecture, a GPU can be especially apt at executing graphics commands that often include the same operation executed on a multitude of different data sets (e.g., operations to change the state of pixels of a display).

Because GPU operating systems are unable to effectively utilize virtual memory spaces, they are often incapable of operating in portions of virtual memory that are not guaranteed to be present in physical memory. Put differently, for example, many GPUs cannot handle page faults. Thus, when the CPU's operating system, which manages the virtual memory spaces, allocates a virtual memory space for an application running commands on the GPU, the application must either be initially allocated a pinned virtual memory space or must copy the virtual memory space over to a pinned memory space when the commands are executed by the GPU.

BRIEF SUMMARY OF EMBODIMENTS

What is needed, therefore, are methods and systems that allow for a GPU to handle page faults, thereby allowing the GPU to operate in unpinned portions of a virtual memory space. Embodiments of the present invention provide techniques for the GPU to issue a precise exception in the face of a page fault and inform the operating system that a page fault has occurred. The operating system can bring the requested address into memory.

In an embodiment, a method of processing memory requests in a first processing device is provided. The method includes generating a memory request associated with a memory address located in an unpinned memory space managed by an operating system running on a second processing device; and responsive to a determination that the memory address is not resident in a physical memory, transmitting a message to the second processing device. In response to the message, the operating system controls the second processing device to bring the memory address into the physical memory.

In another embodiment, a processing device is provided. The processing device includes an execution unit configured to generate a memory request associated with a memory address located in an unpinned memory space managed by an operating system running on another processing device and an address processing unit having a memory fault module that is configured to, responsive to a determination that the memory address is not resident in a physical memory, transmit a message to the other processing device, wherein in response to the message, the operating system is configured to control the other processing device to make the memory address resident in the physical memory.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate the present invention and, together with the description, further serve to explain the principles of the invention and to enable a person skilled in the pertinent art to make and use the invention. Various embodiments of the present invention are described below with reference to the drawings, wherein like reference numerals are used to refer to like elements throughout.

FIG. 1 is an illustrative block diagram of a conventional processing system.

DETAILED DESCRIPTION

Figure 2:
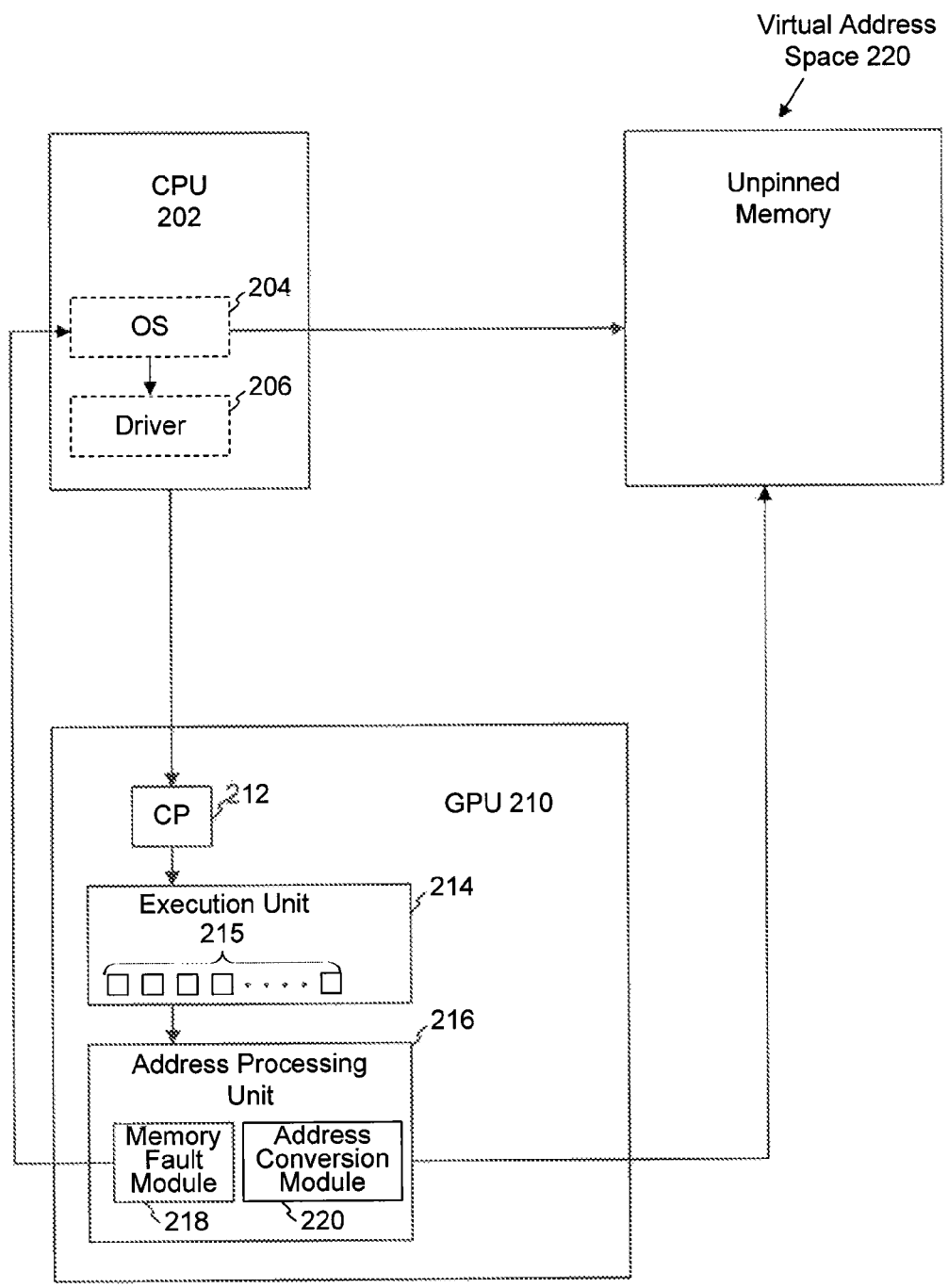
FIG. 2 is an illustrative block diagram of a processing system, according to an embodiment of the present invention.

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

FIG. 1 is, a block diagram illustration of a conventional processing system 100. Processing system 100 includes a central processing unit (CPU) 102 and a graphics processing unit (GPU) 110. CPU 102 and GPU 110 both access a virtual memory space 120. Virtual memory space 120 includes an unpinned memory space 122 and a pinned memory space 124.

CPU 102 has an operating system 104 and a driver 106 running thereon. As would be apparent to those skilled in the relevant art, FIG. 1 is an illustration of CPU 102 with a single driver 106. In alternate embodiments, CPU 102 can have multiple different drivers running thereon. Operating system 104 manages virtual memory space 120. In particular, operating system 104 allocates a virtual memory space for each application running on CPU 102. In FIG. 1, virtual memory space 120 represents the total virtual memory managed by operating system 104. Operating system 104 also manages when pages of virtual memory space 120 are brought into and removed from system memory (not shown in FIG. 1, but shown in FIG. 4).

As shown in FIG. 1, virtual memory space 120 is divided into unpinned memory 122 and pinned memory 124. Pinned memory 124 includes virtual addresses that are guaranteed to be resident in system memory. Thus, accesses to pinned memory 124 will never result in a page fault. On the other hand, no such guarantee exists for unpinned memory 122. Rather, accesses to unpinned memory 122 may or may not result in page faults.

GPU 110 includes a command processor 112, an execution unit 114, and an address processing unit 116. Command processor 112 receives commands from driver 106 and inputs those commands to execution unit 114. For example, driver 106 can send draw commands to GPU 110 because GPU 110 is especially suited to handle those types of commands. In particular, as shown in FIG. 1, execution unit 114 is a highly parallelized device and includes an array of execution engines 115. As such, GPU 110 can process commands in which different sets of data are operated on in parallel more efficiently than CPU 102, which is a more serialized device.

Draw commands, for example, can involve changes to the state of pixels that make up a display. During the execution of a command, such as a draw command, execution unit 114 can generate memory requests. Address processing unit 116 receives these memory requests and determines whether they are valid.

Address processing unit 116 can be implemented as a translation lookaside buffer (TLB) that receives a virtual address of a memory request from execution engine 114 and maps the virtual address to a physical address of system memory. If the virtual address does not correspond to any physical address in system memory, address processing unit 116 will deem the memory request to be invalid.

Memory requests from execution unit 114 can only access pinned memory 124. Thus, when allocating a virtual memory space for applications that send commands to GPU 110, operating system 104 will allocate portions of pinned memory 124. Additionally or alternatively, operating system 104 may be forced to copy portions of unpinned memory 122 to pinned memory 124 when commands are sent to GPU 110 for execution. These additional steps, such as the requirement to copy portions of unpinned memory, significantly hinder the performance of processing system 100. One hindrance in particular is conventional GPU 110's inability to handle page faults.

As would be appreciated by those skilled in the relevant arts based on the description herein, operating system 104 can have a variety of techniques for efficiently paging in and out of the system memory so as to minimize the total number of page faults and optimize performance. However, requiring that a portion of virtual memory space 120 be guaranteed to be resident in system memory, even if it is only rarely used, decreases the overall effectiveness of these techniques for virtual memory management.

Embodiments of the present invention as described herein enable a processing device, such as a GPU operating in a CPU/GPU environment, to operate in an unpinned virtual memory space. That is, a GPU, or other processing device which does not run an operating system that manages the virtual memory space, is still capable or operating in a virtual memory space that is unpinned.

In one embodiment, a feedback loop is provided by which the occurrence of page faults results in a message being sent to the operating system. The message details the occurrence of the page fault. During a condition known as a "fault and stall," for example, the progress of a thread from which a page fault originated is stalled while the operating system permits the processing device to bring the requested address into memory (e.g., while the operating system brings the page into system memory).

During another condition known as a "fault and switch," a process associated with the thread that resulted in the page fault can be context switched out for another thread so that processing time is not wasted.

During both of the above-described conditions, embodiments of the present invention enable the processing device (e.g., the GPU) to issue a precise exception in the face of a page fault. In doing so, the processing device has the ability to operate in an unpinned memory space.

FIG. 2 is a block diagram illustration of a processing system 200, according to an embodiment of the present invention. Processing system 200 includes a CPU 202 and a GPU 210. Both CPU 202 and GPU 210 operate in virtual memory space 220 which maps to portions of a system memory (illustrated in FIG. 4 and discussed below). CPU 202 includes an operating system 204 and a driver 206. Among its many tasks, operating system 204 manages virtual memory space 220. Driver 206 can be used by applications executing on CPU 202 via operating system 204 to communicate commands to GPU 210. GPU 210 includes a command processor 212, an execution unit 214, and an address processing unit 216.

Address processing unit 216 includes memory fault module 218 and address conversion module 220. Each of command processor 212, execution unit 214, and address processing unit 216 can be implemented as hardware and/or software. For example, command processor 212 can be implemented as a microcontroller programmable to execute certain instructions in response to commands received from driver 206. In alternate embodiments, command processor 212 can be implemented using programmable logic, e.g., through the use of field programmable logic array (FPGA), as would be appreciated by those skilled in the relevant art based on the description herein.

Execution unit 214 can include an array of execution engines 215 which can be used to execute an operation in parallel on multiple sets of data. Address processing unit 216 can also be implemented as a microprocessor or as programmable hardware using, e.g., FPGA technology. By way of example, address conversion module 220 can be implemented as a TLB that maps virtual addresses received from execution engine 214 to physical addresses of system memory. Memory fault module 218 can be implemented as a software module running on address processing unit 216.

CPU 202 and GPU 210 can be implemented on the same substrate or discretely on different substrates. The operation of processing system 200 will be described in greater detail below with reference to flowchart 300 shown in FIG. 3.

Figure 3:
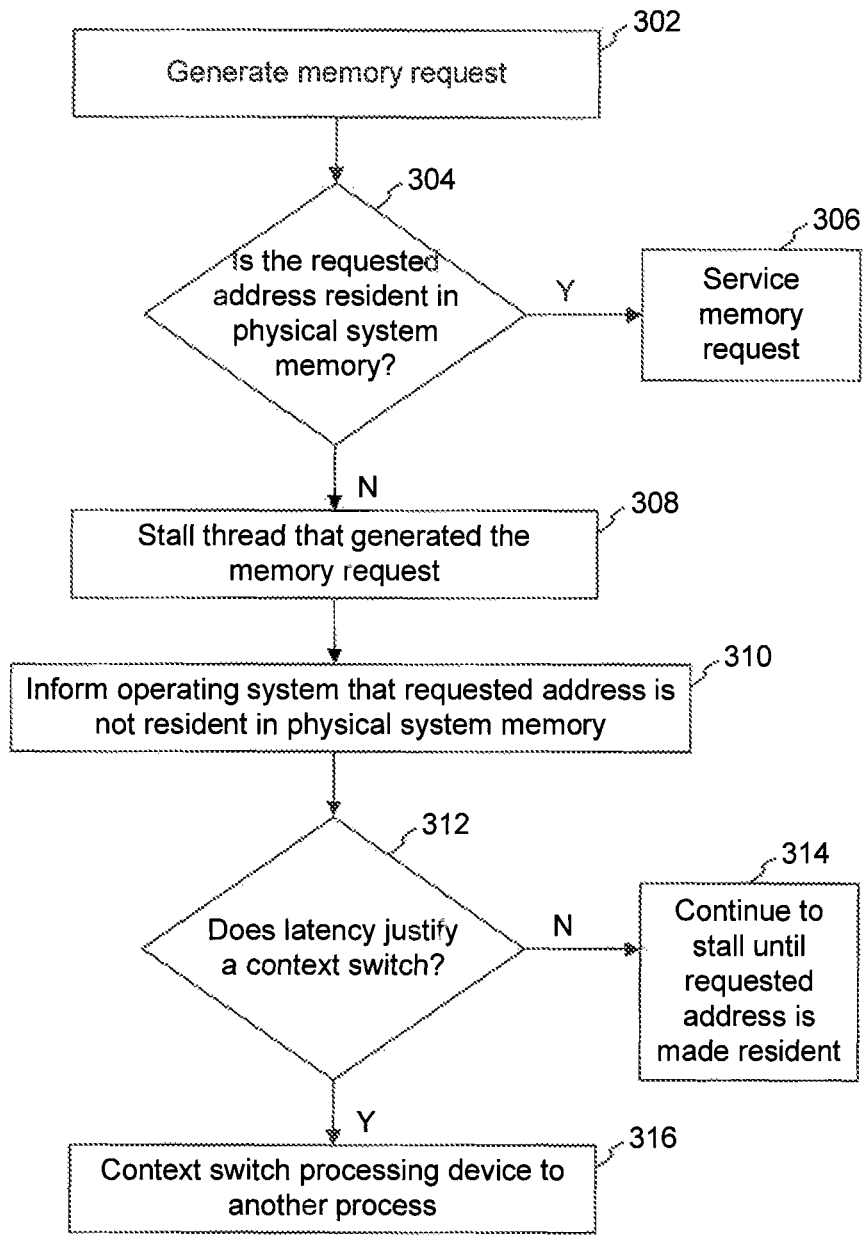
FIG. 3 is a flowchart illustrating a method for processing memory requests, according to an embodiment of the present invention.

FIG. 3 is a flowchart 300 of an exemplary method of practicing an embodiment of the present invention. More specifically, the flowchart 300 includes example steps for processing memory requests, according to an embodiment of the present invention. Other structural and operational embodiments will be apparent to persons skilled in the relevant art(s) based on the following discussion. The steps shown in FIG. 3 are not necessarily required to occur in the order shown.

In step 302, a memory request is generated. For example, in FIG. 2, execution unit 214, while executing a command received from driver 206, can generate a memory request. For example, the memory request can be a write request or a read request and can include a virtual memory address that is included in virtual memory space 220. As shown in FIG. 2, all of virtual memory space 220 is unpinned.

In step 304, it is determined whether the requested address is resident in physical system memory. For example, in FIG. 2, address processing unit 216 can receive the memory request from execution unit 214. Address processing unit 216 can access address conversion module 220 to determine whether the requested virtual memory address is resident in memory. For example, as noted above, address conversion module 220 can be implemented as a TLB that returns a physical address in response to the virtual address received from execution unit 214. If the virtual address received from execution unit 214 does not map to a physical address, address processing unit 216 determines that the requested address is not resident in memory. In an embodiment, a TLB can be implemented as a cache. In such an embodiment, the virtual address mapping or not mapping to a physical address in system memory is indicated as a cache hit or miss, respectively.

Figure 4:
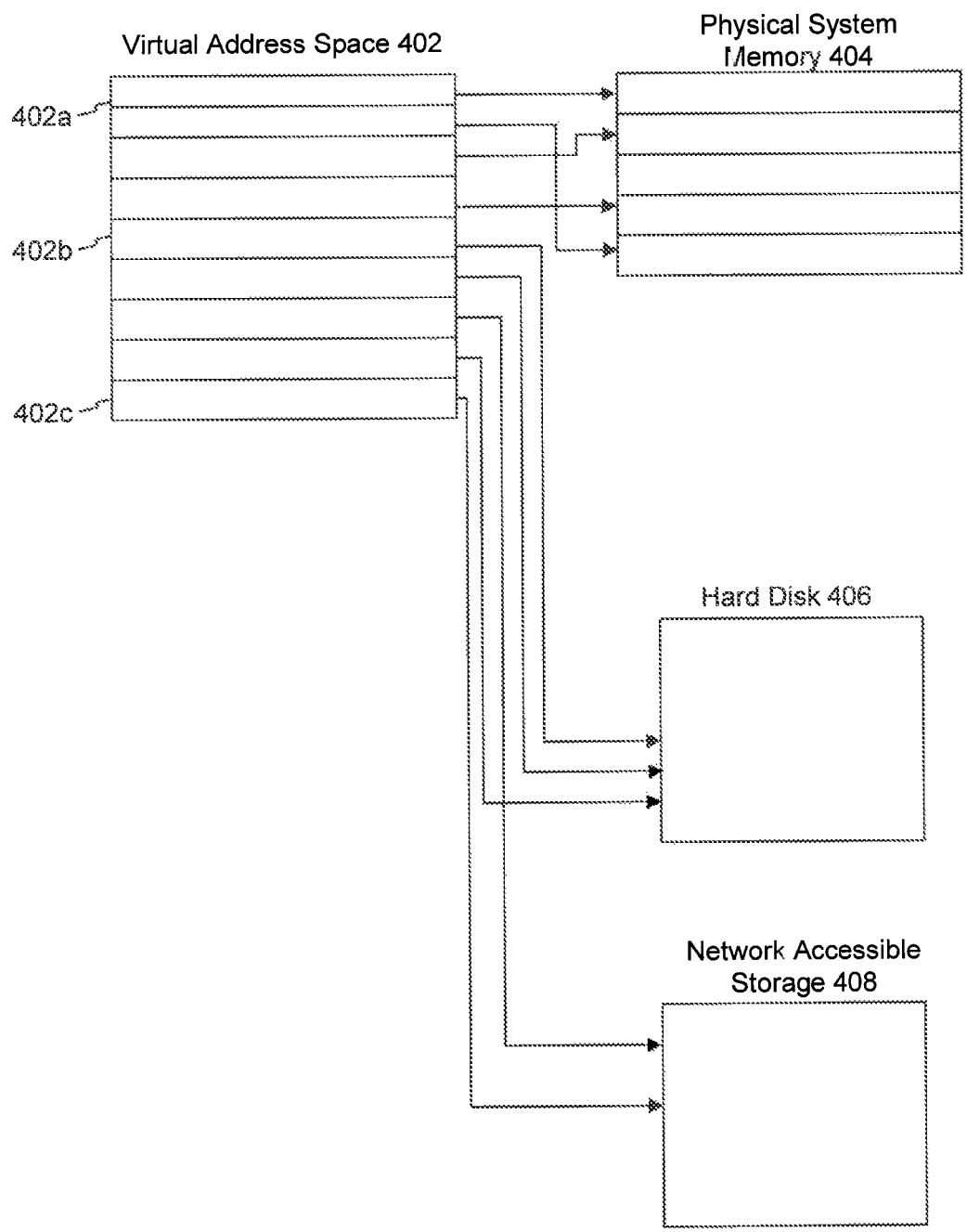
FIG. 4 is an illustrative diagram of a memory diagram, according to an embodiment of the present invention.

FIG. 4 is an illustration of an example memory diagram 400, according to an embodiment of the present invention. Memory diagram 400 includes a virtual memory space 402, a physical system memory 404, a hard disk 406, and a network accessible storage 408. As shown in FIG. 4, virtual memory space 402 can be partitioned into a set of pages. In an embodiment, the address requested by execution unit 214 can be located in page 402a. As shown in FIG. 4, page 402a is resident in physical system memory 404. In other examples, however, the requested address can be located in page 402b or page 402c, neither of which is resident in physical system memory 404. Page 402b is located in a hard disk 406 and page 402c is located in a network accessible storage 408. Network accessible storage 408 can be accessible over one or more of a number of different types of networks known to those skilled in the relevant art (e.g., over the Internet).

If the requested address is resident in memory, flowchart 300 proceeds to step 306. In step 306, the memory request is serviced, e.g., according to steps that would be apparent to those skilled in the relevant art. If the requested address is not requested in system memory, step 308 is reached. In step 308, the thread that generated the memory request becomes stalled. For example, in FIG. 2, the thread running on execution unit 214 that generated the memory request can be stalled. In an embodiment, the stalling of this thread requires no additional actions by GPU 210. In particular, the thread will wait for a response to its memory request. During that waiting period for satisfaction of this request, the thread it will not proceed in execution, and thus becomes stalled.

In step 310, the operating system is informed that the requested address is not resident in physical system memory. For example, in FIG. 2, memory fault module 218 can control address processing unit 216 to send a message to CPU 202 alerting operating system 204 that the requested address is not resident in physical system memory, e.g., informing operating system 204 that a page fault has occurred. Thus, processing system 200 includes a feedback loop by which operating system 204 can learn of page faults from other devices (i.e., GPU 210).

In step 312, it is determined whether a latency created by resolving a page fault justifies context switching.

For example, operating system 204 can be configured to determine and quantify latency associated with different types of page faults. The different types of page faults can be specified according to where the page is located and the state of the page in that location. For example, in FIG. 4, if the requested address is located in page 402a, but page 402a is read only, and the request is a write request, a page fault will occur. However, this page fault can be resolved relatively quickly. Thus, the high processing cost associated with context switching is not justified by that type of a page fault. In another embodiment, if the requested address is located in page 402b or page 402c, a relatively high latency can be expected, e.g., greater than 1 millisecond (ms). Performing a context switch in this latter example might be more easily justified.

If the latency does not justify a context switch, flowchart 300 proceeds to step 314. In step 314, the thread continues to be stalled until the requested address is brought into physical system memory.

On the other hand, if the latency does justify a context switch, flowchart 300 proceeds to step 316. In step 316, the processing device is context switched to another process. For example, in FIG. 2, operating system 204 can prompt driver 206 to send a command to command processor 212 to context switch execution unit 214. In response to the received command, command processor 212 can be configured to context switch out the process. For more information on context switching, see U.S. Provisional Patent Application No. 61/423,385, entitled, "Method and System for Content Switching," which is incorporated herein in its entirety. After the other process has completed its operation, command processor 212 can context switch execution unit 214 back to the original process.

The present invention has been described above with the aid of functional building blocks illustrating the implementation of specified functions and relationships thereof. The boundaries of these functional building blocks have been arbitrarily defined herein for the convenience of the description Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A method comprising:
    generating, by a processing device, a page fault in response to a memory request associated with a memory address located in a virtual memory space; and
    performing, by the processing device, a context switch in response to a value of a latency caused by the page fault exceeding a threshold,
    wherein the value of the latency is based on at least one of an estimated time to retrieve a page causing the page fault or a memory state of the page causing the page fault.

2. The method of claim 1, further comprising:
    transmitting the page fault from the processing device to another processing device;
    determining the value of the latency by the another processing device; and
    receiving a command to perform the context switch at the processing device from the another processing device.

3. The method of claim 2, wherein the processing device is a graphics processing device.

4. The method of claim 2, wherein the another processing device is a central processing device.

5. The method of claim 2, wherein the processing device and the another processing device are implemented on a same substrate.

6. The method of claim 2, further comprising:
stalling execution of a thread that generated the memory request in response to the page fault.

7. The method of claim 2, wherein the performing the context switch comprises:
context switching from a first process to a second process, wherein the memory request was generated in response to executing a thread associated with the first process.

8. The method of claim 7, further comprising:
restarting execution of the thread associated with the first process in response to completion of execution of a thread associated with the second process.

9. The method of claim 2, further comprising:
receiving notification of the page fault at the another processing device from the first processing device; and
transmitting instructions to perform the context switch from the another processing device to the first processing device.

10. The method of claim 2, wherein determining the value of the latency is based on the estimated time to retrieve the page causing the page fault and the state of the page causing the page fault.

11. A processing device comprising:
an address processing unit configured to generate a page fault in response to a memory request associated with a memory address located in a virtual memory space; and
a command processor configured to perform a context switch, in response to a value of a latency exceeding a threshold,
wherein the value of the latency is based on at least one of an estimated time to retrieve a page causing the page fault or a memory state of the page causing the page fault.

12. The processing device of claim 11, wherein the processing device comprises a graphics processing device.

13. The processing device of claim 11, wherein the processing device is configured to stall execution of a thread that generated the memory request in response to the page fault.

14. The processing device of claim 11, wherein the command processor is further configured to perform the context switch from a thread associated with a first process to a second process, wherein the memory request was generated in response to executing the thread associated with the first process.

15. The processing device of claim 14, wherein the command processor is further configured to restart execution on the thread associated with the first process in response to completion of execution of a thread associated with the second process.

16. The processing device of claim 11, wherein the value of the latency is based on the estimated time to retrieve the page causing the page fault and the state of the page causing the page fault.

17. The processing device of claim 11, further comprising:
an execution unit configured to generate the memory request.

18. The processing device of claim 17, wherein the execution unit comprises:
an array of execution engines configured to perform parallel processing.

19. The processing device of claim 11, further comprising:
a memory fault module disposed in the address processing unit and configured to notify another processing device of the page fault.

20. The processing device of claim 19, further comprising:
an address conversion unit disposed in the address processing unit and configured to map a virtual memory address in the virtual memory space to a physical memory address in system memory.

21. A system comprising:
a first processing device comprising an address processing unit and a command processor; and
a second processing device,
wherein the address processing unit is configured to generate a page fault in response to a memory request associated with a memory address located in a virtual memory space,
wherein the second processing device is configured to determine a value of a latency based on at least one of an estimated time to retrieve a page causing the page fault or a memory state of the page causing the page fault, and
wherein the command processor is configured to perform a context switch in response the value of the latency exceeding a threshold.

22. The system of claim 21, further comprising:
a memory fault module disposed in the address processing unit and configured to notify the second processing device of the page fault.

23. A method comprising:
receiving notification of a page fault in response to a memory request associated with a memory address located in a virtual memory space;
determining a value of a latency caused by the page fault based on at least one of an estimated time to retrieve a page causing the page fault or a memory state of the page causing the page fault; and
instructing a processing device to perform a context switch in response to the value of the latency exceeding a threshold.

* * * * *